June 27, 1933.                H. SOMERVELL                1,916,081
                                 TRUCK
                         Filed Nov. 21, 1931        6 Sheets-Sheet 2
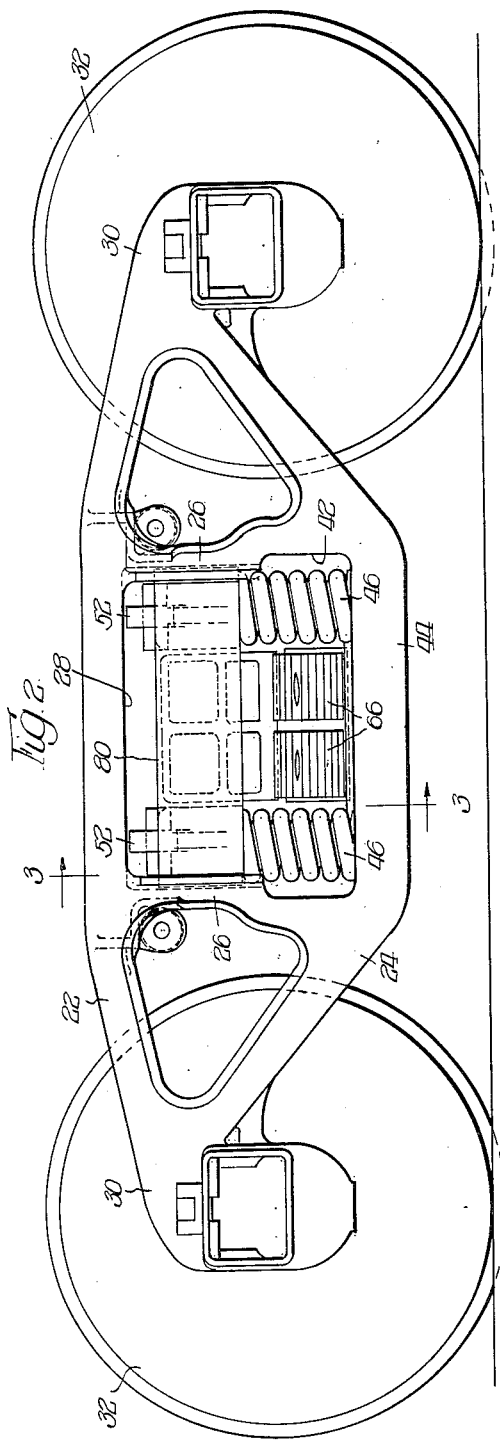
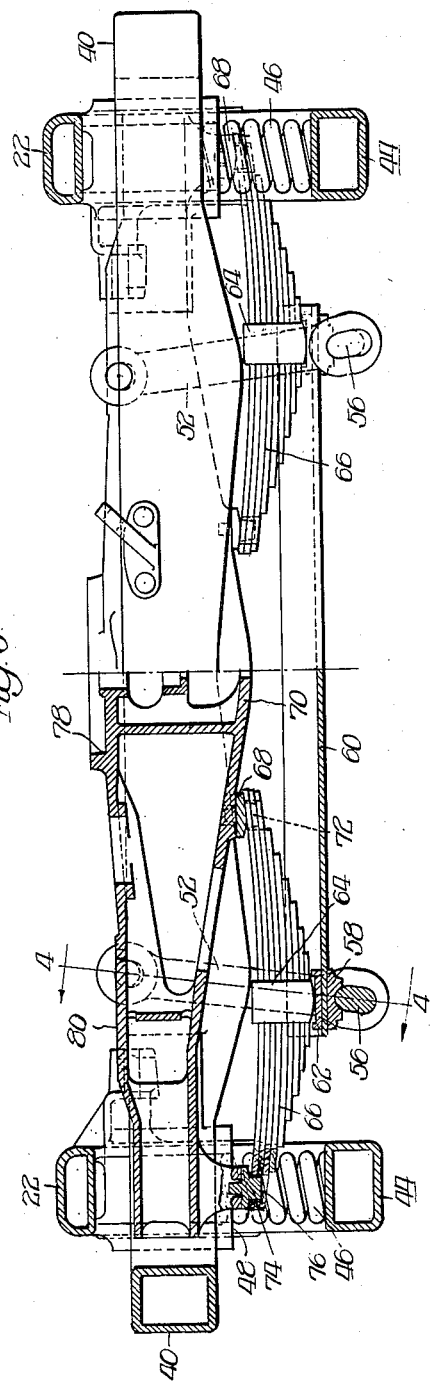
Inventor:
Howard Somervell,

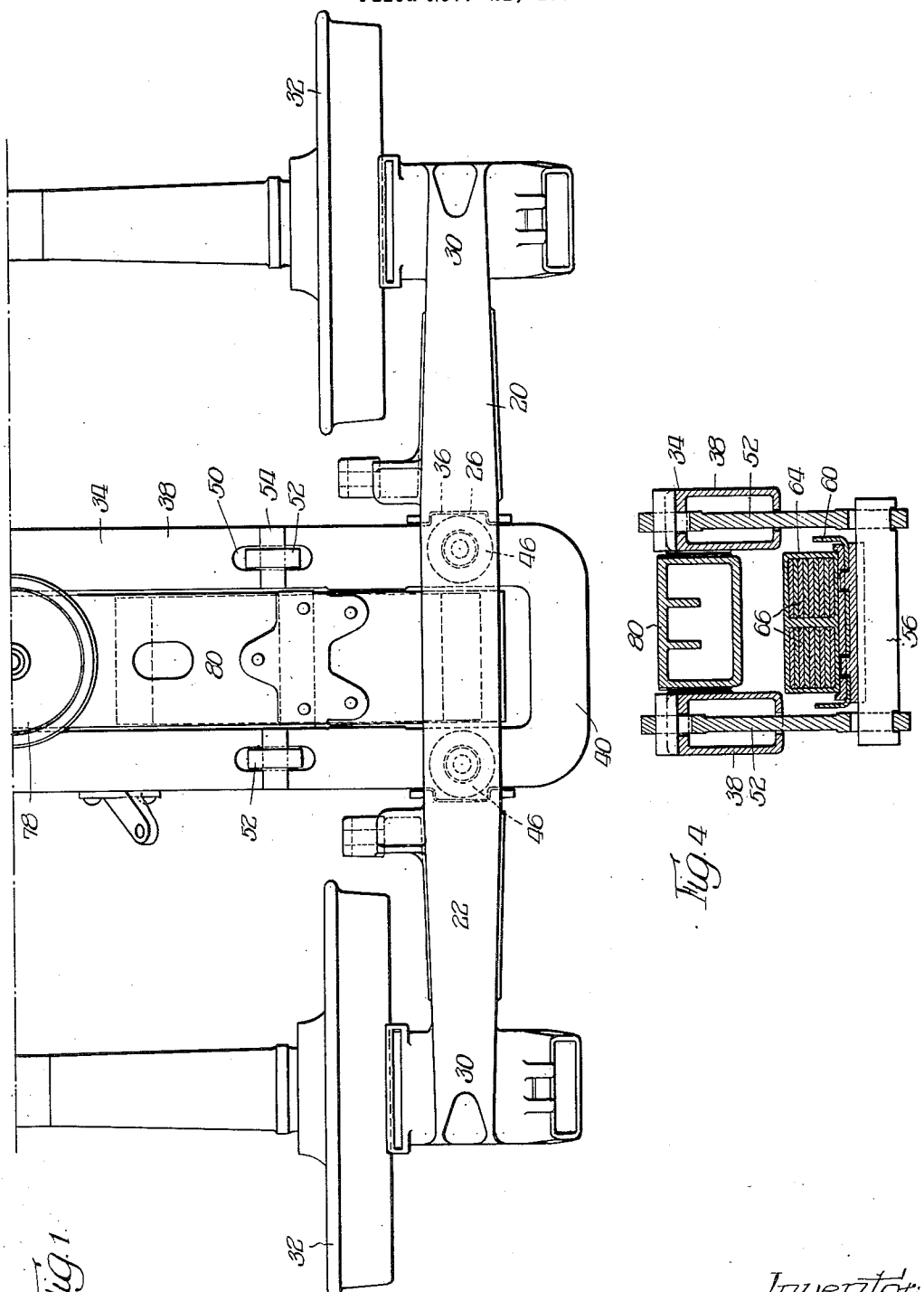

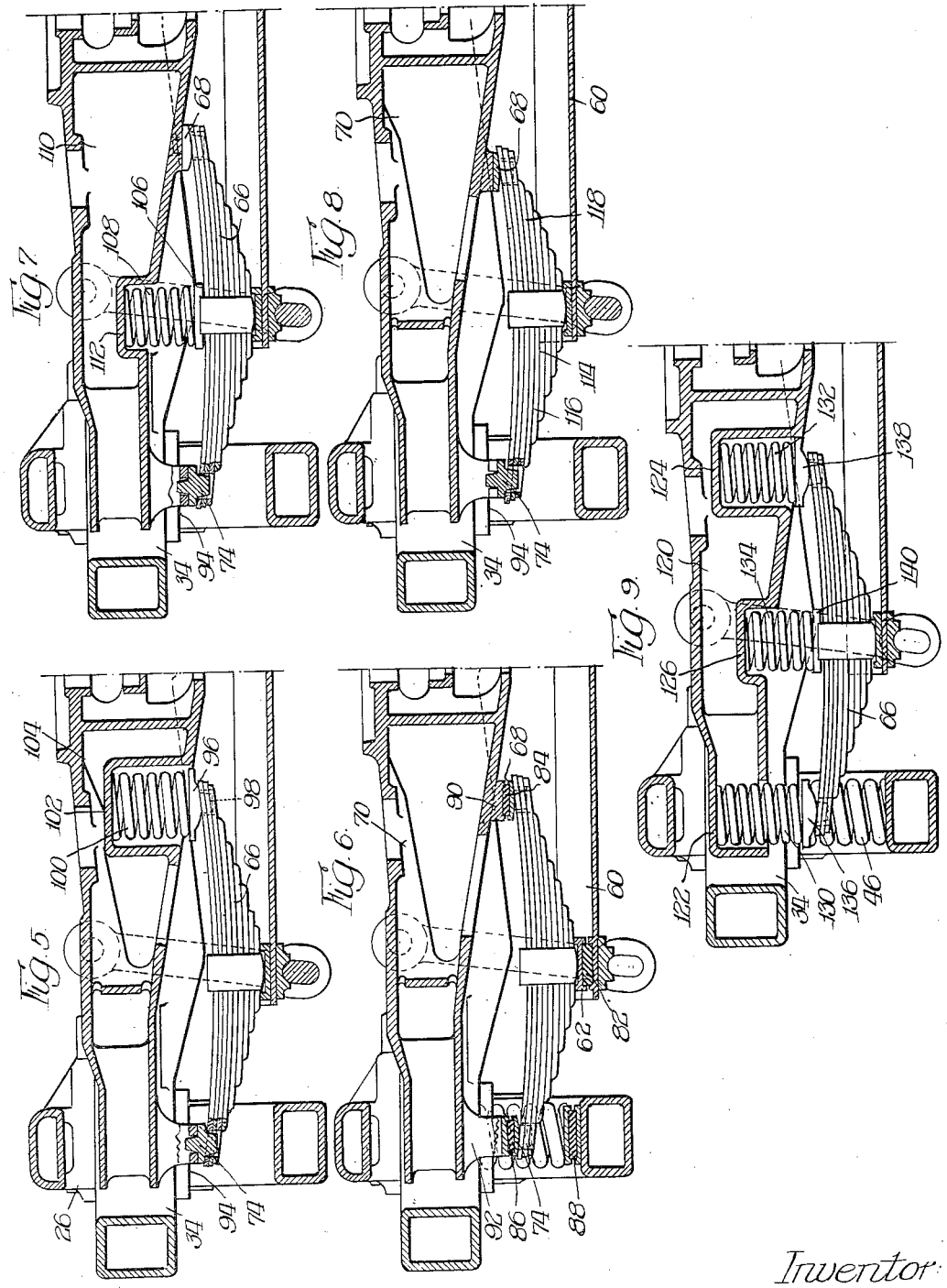

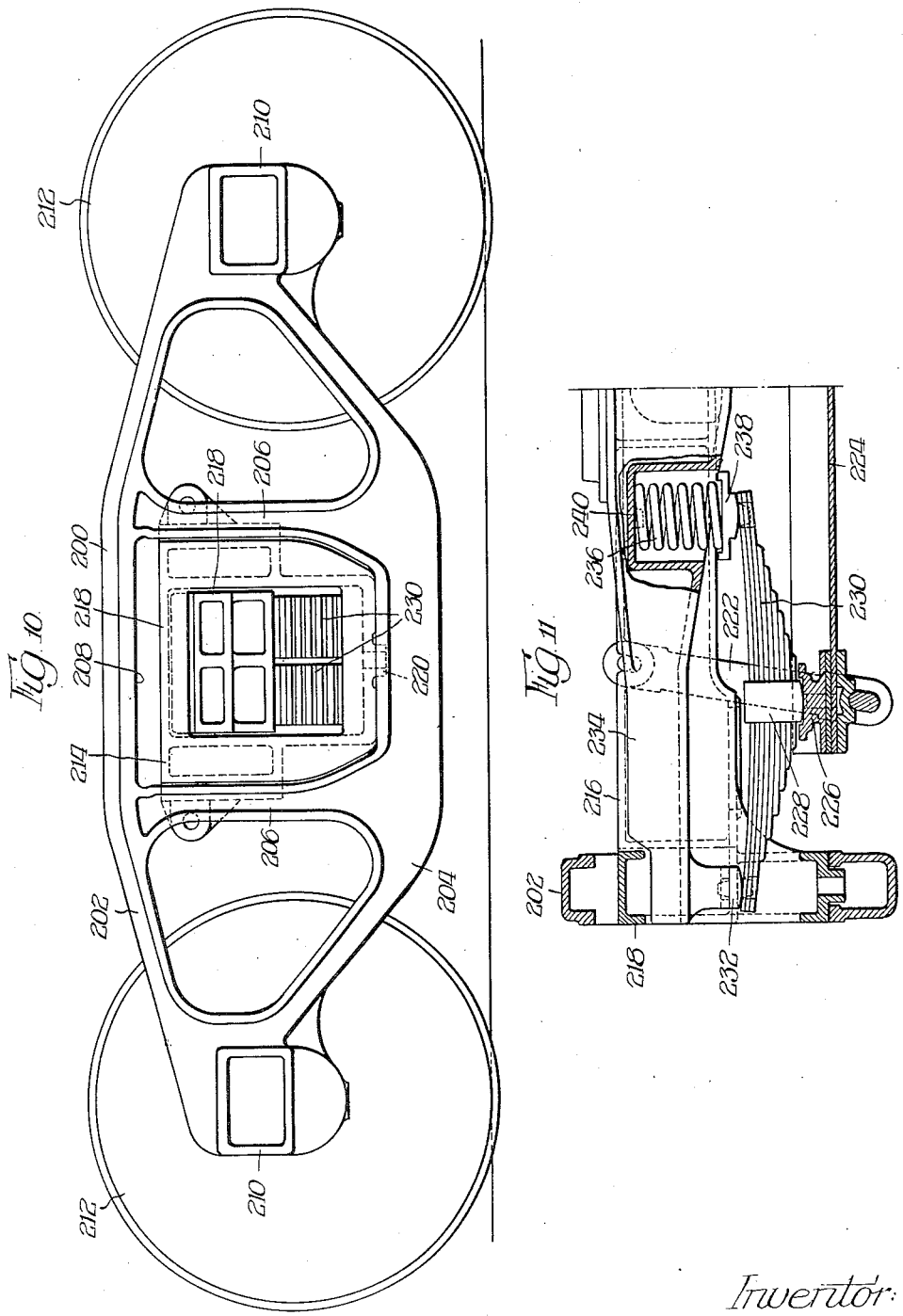

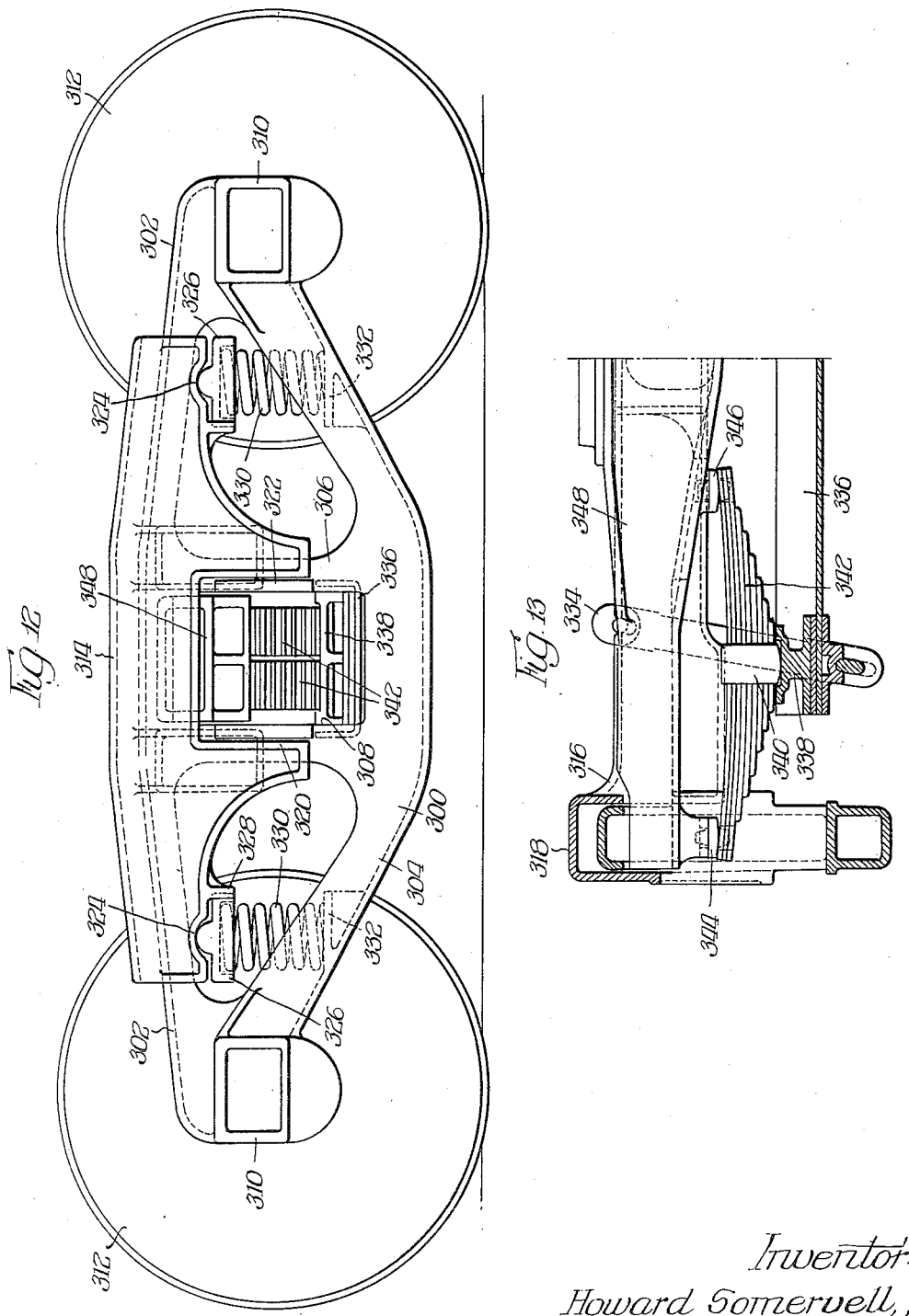

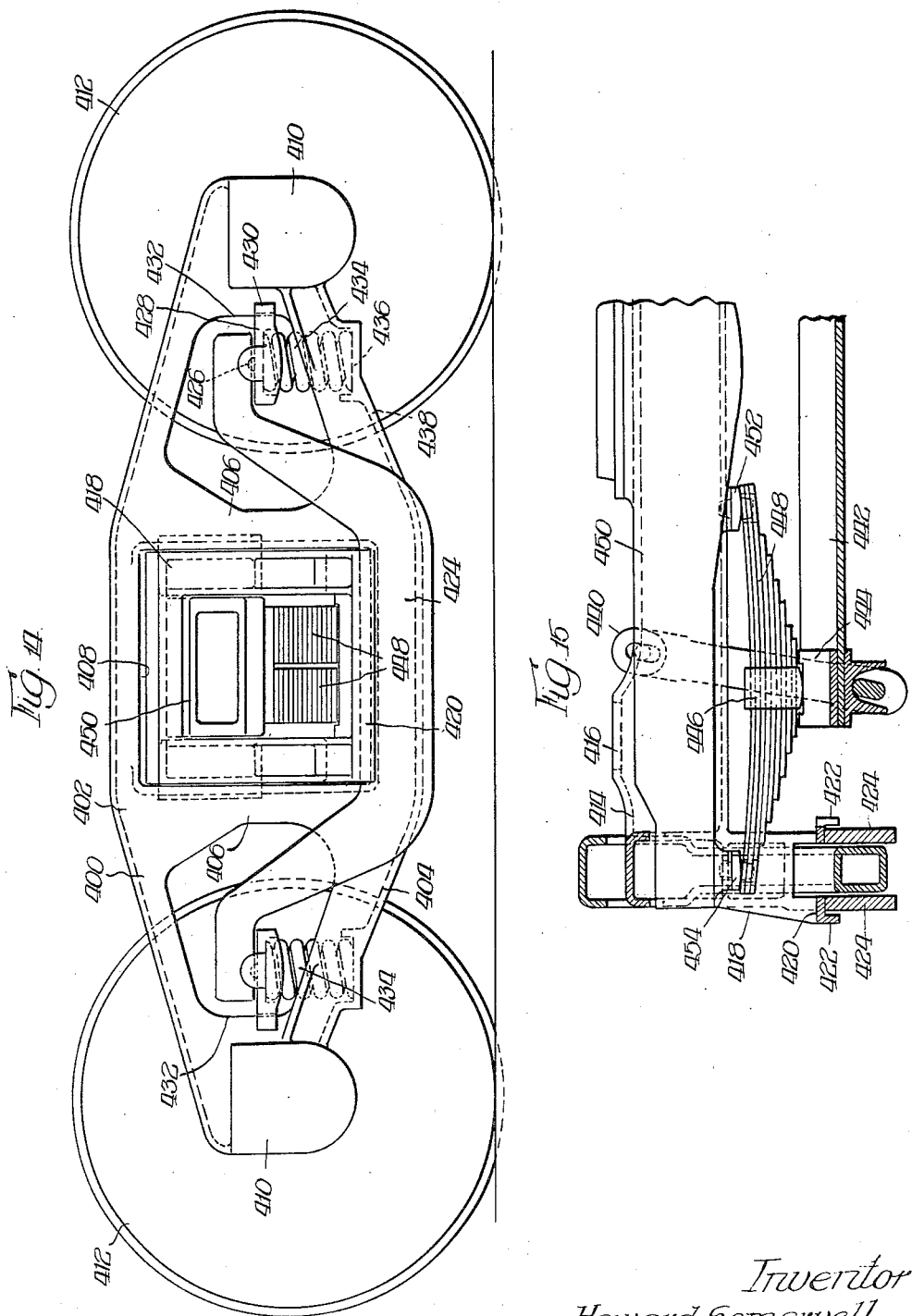

Patented June 27, 1933

1,916,081

UNITED STATES PATENT OFFICE

HOWARD SOMERVELL, OF EVANSTON, ILLINOIS, ASSIGNOR TO AMERICAN STEEL FOUNDRIES, OF CHICAGO, ILLINOIS, A CORPORATION OF NEW JERSEY

TRUCK

Application filed November 21, 1931. Serial No. 576,527.

This invention pertains to car trucks.

Desirable features for freight car trucks are economy, simplicity, lightness, strength and ease of maintenance, and these features are generally obtained within practical limitations on freight trucks now in use. However, present freight car trucks are very deficient in easy riding qualities since the spring suspension usually consists only of coil springs which strike a natural period of oscillation or vibration at some operating speed of the car; the resulting motion imparted to truck parts, car body and lading is violent and destructive and results in much damage to lading. Track or wheel irregularities, even if very slight, will set up this oscillation and when the frequency with which these irregularities are passed over agrees with the vibration period of the springs the motion amplifies and continues, due to the lack of dampening qualities in coil springs. The motion may amplify to the extent of causing derailment of the truck.

Efforts have been made to improve this condition by the use of frictional devices with the coil springs for the purpose of dampening the motion, but unless considerable friction is obtained they are not effective enough, and if sufficient friction is obtained the spring action becomes too stiff and lacks sensitivity.

Passenger car trucks are generally easy riding, due to the use of both coil and elliptic leaf springs in series; the coil springs responding to the light quick shocks, the leaf springs to the slow, heavy impulses. Coil springs are quick and sensitive, leaf springs relatively less so, in response. For this reason, and also by providing coil and leaf springs of different natural vibration periods, they tend to dampen each other's synchronous vibration without impairing free spring response. This condition is obtained by having the different springs in series. Placing leaf and coil springs in parallel is not sufficient, since they then act as a unit and have a common period of vibration.

Although the usual passenger car truck with series arrangement of coil and leaf springs gives good riding qualities, it is undesirably heavy, costly and complicated for freight service. This is partly due to the complete duplication of carrying capacity in both coil and leaf springs.

A passenger car truck also contributes to easy riding by having the bolster suspended on inclined swing hangers for lateral motion to soften lateral shocks.

It is therefore an object of this invention to provide a car truck which provides good riding qualities, and at the same time is economical to make and maintain, is simple and light in construction, and fulfills all requirements of manufacture and service.

Another object of the invention is to provide a car truck wherein the spring suspension is such that springs of different character are placed in series without complete duplication of carrying capacity in each kind.

A further object of the invention is to provide a car truck having springs of different character which are adapted to work independently of each other whereby shocks incident to operation are adequately absorbed.

A still further object of the invention is to provide a car truck wherein the springs are arranged so that each dampens out the other's vibration.

Yet another object is to provide a car truck having a simple and economical lateral motion bolster construction with inclined swing hangers.

A yet further object is to provide a truck construction wherein resilient pads are provided for dampening out metallic vibrations transmitted through the metallic truck parts, and also for the purpose of deadening noise.

A different object is to provide spring assemblies wherein there is provided softer cushioning action under light loads, while at the same time providing the necessary stiffness and capacity under heavy loads, these features being combined also provide a construction which reduces any tendency toward synchronous vibration of the springs.

With these and various other objects in view, the invention may consist of certain novel features of construction and operation as will be more fully described and particularly pointed out in the specification, drawings and claims appended hereto.

In the drawings, which illustrate embodiments of the device and wherein like reference characters are used to designate like parts—

Figure 1 is a fragmentary top plan view of one form of truck embodying the invention;

Figure 2 is a side elevation of the truck construction shown in Figure 1;

Figure 3 is a transverse sectional elevation of the truck construction shown in Figures 1 and 2, the section at the right of the figure being taken substantially in the plane as indicated by the line 3—3 of Figure 2, the section at the left of the figure being taken substantially on the transverse center line of Figure 1;

Figure 4 is a sectional elevation taken substantially in the plane as indicated by the line 4—4 of Figure 3;

Figures 5 to 9 inclusive are transverse sectional elevations through modified forms of truck constructions, the same being taken substantially in the transverse center line of such constructions;

Figure 10 is a side elevation of still another modified form of truck construction;

Figure 11 is a transverse fragmentary sectional elevation taken substantially on the transverse center line of the truck construction shown in Figure 10;

Figure 12 is a side elevation of another modified form of truck construction;

Figure 13 is a transverse fragmentary sectional elevation taken substantially on the transverse center line of the truck construction shown in Figure 12;

Figure 14 is a side elevation of yet another modified form of truck construction;

Figure 15 is a transverse fragmentary sectional elevation taken substantially on the transverse center line of the truck construction shown in Figure 14.

Referring first of all more particularly to the construction shown in Figures 1 to 4 inclusive, the side frame 20 is substantially of truss construction including the compression member 22, the tension member 24, and the integral spaced column guides 26 forming the window 28. As shown, the guides are substantially of U-shape facing the window, although they may be flat and the transom provided with embracing lugs. The tension and compression members merge adjacent their ends as at 30 and have cooperative relation with the journal ends of the wheel and axle assemblies 32. The journal boxes of the wheel and axle assemblies are of any preferred construction.

The opposite side frames are connected by means of the transom 34 having complementary guide portions 36 fitting in the column guides, the transom including the spaced members 38 connected by the integral end members 40. The transom is assembled in the window through the enlarged lower portion 42 of the columns 26, and is supported on the spring seat portion 44 of the tension member by means of the coil springs 46, said springs having cooperative relation with suitable spring seats 48 provided on the spaced members 38 substantially in the plane of the side frame. The spaced members 38 are slotted as at 50 and are provided with depending outwardly sloping links or swing hangers 52 pivoted to the members 38 by means of the pins 54 provided in suitable seats in the transom members. The lower ends of the links are connected by means of the cross keys 56, said keys having supporting relation with the seats 58 provided on the spring plank 60.

The spring plank 60 is provided with the spring seat 62 for supporting relation with the spring band 64 of the semi-elliptic spring assembly 66. The inner end of the leaf spring assembly has supporting relation with the spring seat 68 of the bolster 70, being positioned thereon by means of the depending dowel 72 disposed in a suitable aperture in the inner leg of the leaf spring assembly. The outer leg of the leaf spring assembly has cooperative relation with the seat member 74 provided on the outer end of the bolster 70, the seat member positioning the spring by means of the depending dowel 76. The bolster is provided with the usual center bearing 78 and side bearings 80, and extends within the window 28.

In the construction shown in Figure 5, the transom 34 is seated on the seat member 94 provided on the columns 26, the connection being a non-resilient one. The inner leg of the leaf spring assembly 66 is provided with the spring cap 96 positioned by means of the depending dowel 98 and being provided with the coil spring assembly 100 disposed between the spring cap and the spring seat 102 provided in the bolster 104. The bolster 104 is provided with the seat 74 cooperating with the outer leg of the leaf spring assembly 66 in a manner already described.

In the construction illustrated in Figure 6, the resilient pads 82—84—86—88 are shown disposed between the seat 62 and the spring plank 60, and between the seat 68 and a cooperative seat 90 provided on the bolster 70, and between the seat 74 and a suitable pedestal 92 provided on the outer end of the bolster and between the coil springs and the side frame members. The resilient pads, of course, may also be disposed between other parts of the truck to thus deaden noise.

In the construction shown in Figure 7, the connection between the transom 34 is a non-resilient one on the seat 94 and the inner and outer legs of the leaf spring assembly 66 are mounted as at 66 and 74 as already described. The spring band is provided with the spring cap 106, the coil spring assembly 108 being mounted on said spring cap and supporting the bolster 110 at the spring seat 112.

In the construction shown in Figure 8, the seat 94 non-resiliently supports the transom 34, and a leaf spring assembly 114 is provided in place of the leaf spring assembly 66, being modified in that the outer leg 116 is longer than the inner leg 118 wherein a variable supporting action is provided between the spring plank 60 and the bolster 70. The leaf spring is connected to the bolster at the non-resilient seats 68 and 74. It will of course be understood that coil springs may be disposed between the legs of the leaf spring and the bolster, or between the spring band and the bolster, or in any combination, either providing a resilient support between the transom and the side frame, or a non-resilient connection between the transom and the side frame. It is also to be understood that the leaf spring may be reversed, placing the long leg inwardly, and used with or without coil springs and/or resilient pads.

In the construction shown in Figure 9, the leaf spring assembly 66 is shown resiliently supporting the bolster 120 at the seats 122—124—126, the coil spring assemblies 130—132—134 being interposed between suitable spring caps 136—138—140 disposed on the inner and outer legs of the leaf spring assembly and at the spring bands. In this construction the transom 34 is shown as resiliently supported on the side frame by means of the coil springs 46.

In the construction shown in Figures 10 and 11, the side frame 200 is of truss construction provided with the compression member 202 and the tension member 204, said members being provided with the integral columns 206 forming the window 208. The tension and compression members merge adjacent their ends and are provided with the journal boxes 210 cooperating with the journal ends of the wheel and axle assemblies 212. The transom 214 includes the spaced members 216 integrally connected at their ends by means of the vertically disposed member 218 so shaped as to fit within the columns 206 by being of less depth than the window to permit assembly. The transom is positioned by means of the depending dowel 220. The members 216 are provided with the swing hanger links 222 supporting the spring plank 224. The spring plank is provided with the spring seat 226 cooperating with the spring band 228, and the semi-elliptic spring assembly 230 which may be of either the equal leg type or of the variable leg type. The outer end of the leaf spring assembly substantially in the plane of the side frame has a non-resilient connection through the seat 232 with the outer end of the bolster 234 and the inner end of the leaf spring may have non-resilient connection with the bolster, or may have a resilient connection with the bolster through the coil spring assembly 236 disposed between the spring cap 238 provided on the inner leg of the leaf spring assembly and supporting the bolster at the seat 240. Of course, in this as well as in any of the other constructions or the constructions to be described, resilient pads may be provided and the springs arranged in any combination as disclosed in Figures 5 to 9 inclusive. It will also be understood that the coil springs are of different characteristics from the leaf springs to prevent synchronous oscillations, and the coil springs may be of any character, such as described in application Serial No. 552,153, filed July 21, 1931, Hedgcock.

Referring now more particularly to the constructions shown in Figures 12 and 13, the side frame 300 consists essentially of the compression member 302, tension member 304, and spaced connecting columns 306 forming the window 308. The tension and compression members merge adjacent their ends and are provided with the journal boxes 310 cooperating with the journal ends of the wheel and axle assemblies 312. The transom 314 is disposed to connect and space the opposite side frames and is provided with the spaced members 316 integrally connected adjacent their ends by means of the yoke 318. The yoke is of substantially inverted U-shape, extending over and embracing the compression member 302, being provided with depending guide members 320 having guiding cooperation with suitable guide lugs 322 provided on the columns 306. The outer ends of the yoke are provided with the seat member 324 having cooperation with the spring cap 326, said cap being rockably supported and guided between interengaging lug means 328 provided on the cap and yoke. The spring cap is seated upon the coil spring members 330 which rest upon the seat 332 provided in the tension member. The spaced members 316 are provided with the links 334 rockably supporting the spring plank 336, the spring plank being provided with the spring seat 338 having supporting cooperation with the spring band 340 of the semi-elliptic leaf spring assembly 342. The inner and outer ends of the leaf spring assembly have non-resilient supporting engagement with the seat members 344 and 346 provided on the bolster 348. The end of the bolster extends into the window 308.

Referring now more particularly to the construction illustrated in Figures 14 and 15, the side frame 400 includes the compression member 402 and the tension member 404, and the integral connecting guides 406 forming the window 408. The tension and compression members merge adjacent their ends and are provided with the journal box 410 having cooperative engagement with the journal ends of the wheel and axle assemblies 412. The spaced side frames are connected by means of the transom 414, said transom including the spaced members 416 integrally connected adjacent their ends by means of the crossed frame member 418 having sliding and guiding cooperation with the guides 406. The lower connecting member 420 of the frame 418 is provided with depending flanges 422 adapted to embrace the equalizing members 424 provided on each side of the side frame whereby said members are positioned. The equalizing members 424 extend upwardly and are seated as at 426 on the spring caps 428, said spring caps having lugs 430 embracing the end guides 432 provided on the side frame adjacent the journal boxes. The spring caps are seated on the spring assemblies 434 disposed on seats 436 provided in the lower chord or web 438 of the tension member. The spaced members 416 are provided with the links 440 swingably supporting the spring plank 442, said spring plank being provided with the seat 444 supporting the spring band 446 of the semi-elliptic leaf spring assembly 448. The inner and outer legs of the leaf spring assembly have non-resilient supporting engagement with the bolster 450 at the seats 452 and 454, the outer leg of the leaf spring assembly and the outer end of the bolster extending into the window.

With the above constructions springs of different character are provided in series wherein trucks of easy riding qualities are constructed, and it is to be understood that I do not wish to be limited by the exact embodiments of the device shown which are merely by way of illustration and not limitation, as various and other forms of the device will of course be apparent to those skilled in the art without departing from the spirit of the invention or the scope of the claims.

What is claimed is:

1. In a truck, the combination of a side frame including tension and compression members and spaced column guides forming a window, a transom including spaced members extending into said window and supported on said tension member, a spring plank swingably supported on said spaced members, a bolster disposed between said spaced members and resiliently supported on said spring plank by a semi-elliptic spring, and a plurality of coil springs disposed at each end and adjacent the middle of said semi-elliptic spring and engaging said bolster.

2. In a truck, the combination of a side frame including tension and compression members and spaced column guides forming a window, a transom including spaced members extending into said window and non-resiliently supported on said tension member, a spring plank swingably supported on said spaced members, a bolster disposed between said spaced members and resiliently supported on said spring plank by a semi-elliptic spring engaging said bolster at a plurality of points, and a plurality of coil springs disposed at each end and adjacent the middle of said semi-elliptic spring and engaging said bolster.

3. In a truck, the combination of a side frame including tension and compression members and spaced column guides forming a window, a transom including spaced members extending into said window and non-resiliently supported on said tension member, a spring plank swingably supported on said spaced members, and a bolster disposed between said spaced members and resiliently supported on said spring plank by a semi-elliptic spring and a coil spring disposed intermediate the ends of said semi-elliptic spring.

4. In a car truck, the combination of a side frame including tension and compression members and spaced integrally connecting columns forming a window, a transom supported in said window, a spring plank supported on said transom, a bolster, a semi-elliptic leaf spring supported on said spring plank at a point intermediate the ends of said leaf spring and supporting said bolster at spaced points, and a coil spring interposed between said bolster and leaf spring inwardly of said side frame.

5. In a car truck, the combination of a side frame including tension and compression members and spaced integrally connecting columns forming a window, a transom supported in said window, a spring plank supported on said transom, a bolster, a semi-elliptic leaf spring supported on said spring plank at a point intermediate the ends of said leaf spring and supporting said bolster at spaced points, and additional supporting means including a coil spring interposed between said bolster and spring plank.

6. In a car truck, the combination of a side frame including tension and compression members and spaced integrally connecting columns forming a window, a transom supported in said window, a spring plank movably supported on said transom, a bolster, a semi-elliptic leaf spring supported on said spring plank at a point intermediate the ends of said leaf spring and supporting said bolster at spaced points and a coil spring interposed between said bolster and leaf spring at the inner of said spaced points.

7. In a car truck, the combination of a side frame including tension and compression members and spaced integrally connecting columns forming a window, a transom supported in said window, a spring plank movably supported on said transom, a bolster, a semi-elliptic leaf spring supported on said spring plank at a point intermediate the ends of said leaf spring and supporting said bolster at spaced points and a metallic spring interposed between said bolster and leaf spring at the inner of said spaced points.

8. In a car truck, the combination of a side frame including tension and compression members and spaced integrally connecting columns forming a window, a transom supported in said window, a spring plank movably supported on said transom, a bolster, a semi-elliptic leaf spring supported on said spring plank at a point intermediate the ends of said leaf spring and supporting said bolster at spaced points and a coil spring interposed between said bolster and leaf spring at the inner of said spaced points, and a coil spring interposed between said bolster and said spring plank.

9. In a car truck, the combination of a side frame including tension and compression members and spaced integrally connecting columns forming a window, a transom supported in said window, a spring plank movably supported on said transom, a bolster, a semi-elliptic leaf spring supported on said spring plank at a point intermediate the ends of said leaf spring and supporting said bolster at spaced points and a coil spring interposed between said bolster and leaf spring at the inner of said spaced points, and a coil spring interposed between said bolster and said leaf spring.

10. In a car truck, the combination of a side frame including tension and compression members and spaced integrally connecting columns forming a window, said columns being provided with supporting means disposed in said window between said tension and compression members, a transom including spaced members seated on said supporting means and connecting end members, a spring plank movably supported on said transom, a bolster disposed between said spaced members, a semi-elliptic leaf spring supported on said spring plank at a point intermediate the ends of said leaf spring and supporting said bolster at spaced points, and additional supporting means including a coil spring interposed between said bolster and leaf spring.

11. In a car truck, the combination of a side frame including tension and compression members and spaced integrally connecting columns forming a window, said columns being provided with supporting means disposed in said window between said tension and compression members, a transom including spaced members seated on said supporting means and connecting end members, a spring plank movably supported on said transom, a bolster disposed between said spaced members, a semi-elliptic leaf spring supported on said spring plank at a point intermediate the ends of said leaf spring and supporting said bolster at spaced points, and a coil spring interposed between said bolster and leaf spring and intermediate the ends of said leaf spring.

12. In a car truck, the combination of a side frame including tension and compression members and spaced integrally connecting columns forming a window, said columns being provided with supporting means disposed in said window between said tension and compression members, a transom including spaced members seated on said supporting means and connecting end members, a spring plank movably supported on said transom, a bolster disposed between said spaced members, a semi-elliptic leaf spring supported on said spring plank at a point intermediate the ends of said leaf spring and supporting said bolster at spaced points, and additional supporting means including a coil spring interposed between said bolster and spring plank.

13. In a car truck, the combination of a side frame including tension and compression members and spaced integrally connecting columns forming a window, said columns being provided with supporting means disposed in said window between said tension and compression members, a transom including spaced members seated on said supporting means and connecting end members, a spring plank movably supported on said transom, a bolster disposed between said spaced members, a semi-elliptic leaf spring supported on said spring plank at a point intermediate the ends of said leaf spring and supporting said bolster at spaced points, and a coil spring interposed between said bolster and spring plank and intermediate the ends of said leaf spring.

14. In a car truck, the combination of a side frame including tension and compression members and spaced integrally connecting columns forming a window, said columns being provided with supporting means disposed in said window between said tension and compression members, a transom including spaced members seated on said supporting means and connecting end members, a spring plank movably supported on said transom, a bolster disposed between said spaced members, a semi-elliptic leaf spring supported on said spring plank at a point intermediate the ends of said leaf spring and supporting said bolster at spaced points, and a coil spring interposed between the inner end of said leaf spring and said bolster.

15. In a car truck, the combination of a side frame including tension and compression members and spaced integrally connecting columns forming a window, said columns being provided with supporting means disposed in said window between said tension and compression members, a transom including spaced members seated on said supporting means and connecting end members, a spring plank movably supported on said transom, a bolster disposed between said spaced members, a semi-elliptic leaf spring supported on said spring plank at a point intermediate the ends of said leaf spring and supporting said bolster at spaced points, and coil springs interposed between said bolster and leaf spring at said spaced points.

16. In a car truck, the combination of a side frame including tension and compression members and spaced integrally connecting columns forming a window, said columns being provided with supporting means disposed in said window between said tension and compression members, a transom including spaced members seated on said supporting means and connecting end members, a spring plank movably supported on said transom, a bolster disposed between said spaced members, a semi-elliptic leaf spring supported on said spring plank at a point intermediate the ends of said leaf spring and supporting said bolster at spaced points, and coil springs interposed between said bolster and leaf spring at said spaced points and intermediate said spaced points.

17. In a car truck, the combination of a side frame including tension and compression members and spaced integrally connecting columns forming a window, a transom supported in said window, a spring plank supported on said transom, a bolster, a semi-elliptic leaf spring supported on said spring plank at a point intermediate the ends of said leaf spring and supporting said bolster at spaced points, and coil springs interposed between said bolster and leaf spring inwardly of said side frame between said spaced points.

18. In a car truck, the combination of a side frame including tension and compression members and spaced integrally connecting columns forming a window, a transom supported in said window, a spring plank supported on said transom, a bolster, a semi-elliptic leaf spring supported on said spring plank at a point intermediate the ends of said leaf spring and supporting said bolster at spaced points, and coil springs interposed between said bolster and leaf spring inwardly of said side frame between said spaced points and intermediate said spaced points.

19. In a car truck, the combination of a side frame including tension and compression members and spaced integrally connecting columns forming a window, a transom supported in said window, a spring plank movably supported on said transom, a bolster provided with spaced horizontally aligned spring seats, a semi-elliptic leaf spring supported on said spring plank at a point intermediate the ends of said leaf spring and supporting said bolster on said aligned seats, and a coil spring interposed between said bolster and leaf spring.

20. In a car truck, the combination of a side frame including tension and compression members and spaced integrally connecting columns forming a window, a transom supported in said window, a spring plank movably supported on said transom, a bolster provided with spaced horizontally aligned spring seats, a semi-elliptic leaf spring supported on said spring plank at a point intermediate the ends of said leaf spring and supporting said bolster on said aligned seats, and a coil spring interposed between said bolster and leaf spring intermediate said aligned seats.

21. In a car truck, the combination of a side frame including tension and compression members and spaced integrally connecting columns forming a window, a transom supported in said window, a spring plank movably supported on said transom, a bolster provided with spaced leaf spring seats, one of said seats being disposed inwardly of the side frame and the other of said seats being disposed substantially in the plane of said side frame, a semi-elliptic leaf spring supported on said spring plank at a point intermediate the ends of said leaf spring and supporting said bolster at said spring seats, and a coil spring interposed between said bolster and said leaf spring.

22. In a car truck, the combination of a side frame including tension and compression members and spaced integrally connecting columns forming a window, a transom supported in said window, a spring plank movably supported on said transom, a bolster provided with spaced spring seats one of said seats being disposed inwardly of the side frame and the other of said seats being disposed substantially in the plane of said side frame, a semi-elliptic leaf spring supported on said spring plank at a point intermediate the ends of said leaf spring and supporting said bolster at said spring seats, and a coil spring interposed between said bolster and said leaf spring intermediate said spring seats.

23. In a car truck, the combination of a side frame including tension and compression members and spaced integrally connecting columns forming a window, a transom supported in said window, a spring plank movably supported on said transom, a bolster, a semi-elliptic leaf spring supported on said spring plank at a point intermediate the ends of said leaf spring and supporting said bolster at spaced points, a coil spring interposed between said bolster and leaf spring substantially in the plane of the side frame and another coil spring interposed between said bolster and leaf spring.

24. In a car truck, the combination of a side frame including tension and compression members and spaced integrally connecting columns forming a window, a transom supported in said window, a spring plank movably supported on said transom, a bolster, a semi-elliptic leaf spring supported on said spring plank at a point intermediate the ends of said leaf spring and supporting said bolster at spaced points, a coil spring interposed between said bolster and leaf spring substantially in the plane of the side frame and another coil spring interposed between the bolster and said semi-elliptic spring.

25. In a car truck, the combination of a side frame including tension and compression members and spaced integrally connecting columns forming a window, a transom supported in said window, a spring plank movably supported on said transom, a bolster, a semi-elliptic leaf spring supported on said spring plank at a point intermediate the ends of said leaf spring and supporting said bolster at spaced points, a coil spring interposed between said bolster and leaf spring substantially in the plane of the side frame and a coil spring interposed between the bolster and said semi-elliptic spring and intermediate the ends of said semi-elliptic spring.

26. In a car truck, the combination of a side frame including tension and compression members and spaced integrally connecting columns forming a window, said columns being provided with supporting means disposed in said window between said tension and compression members, a transom including spaced members seated on said supporting means and connecting end members, a spring plank movably supported on said transom, a bolster disposed between said spaced members, a semi-elliptic leaf spring supported on said spring plank at a point intermediate the ends of said leaf spring and supporting said bolster at spaced points, and a coil spring interposed between said bolster and leaf spring inwardly of said side frame.

27. In a car truck, the combination of a side frame including tension and compression members and spaced integrally connecting columns forming a window, said columns being provided with supporting means disposed in said window between said tension and compression members, a transom including spaced members seated on said supporting means and connecting end members, a spring plank movably supported on said transom, a bolster disposed between said spaced members, a semi-elliptic leaf spring supported on said spring plank at a point intermediate the ends of said leaf spring and supporting said bolster at spaced points, and a coil spring interposed between said bolster and spring plank inwardly of said side frame.

28. In a car truck, the combination of a side frame including tension and compression members and spaced integrally connecting columns forming a window, said columns being provided with supporting means disposed in said window between said tension and compression members, a transom including spaced members seated on said supporting means and connecting end members, a spring plank movably supported on said transom, a bolster disposed between said spaced members, a semi-elliptic leaf spring supported on said spring plank at a point intermediate the ends of said leaf spring and supporting said bolster at spaced points, a coil spring interposed between said bolster and leaf spring substantially in the plane of said side frame and another coil spring disposed between said leaf spring and bolster.

29. In a car truck, the combination of a side frame including tension and compression members and spaced integrally connecting columns forming a window, said columns being provided with supporting means disposed in said window between said tension and compression members, a transom including spaced members seated on said supporting means and connecting end members, a spring plank movably supported on said transom, a bolster disposed between said spaced members, a semi-elliptic leaf spring supported on said spring plank at a point intermediate the ends of said leaf spring and supporting said bolster at spaced points, a coil spring interposed between said bolster and leaf spring substantially in the plane of said side frame and a coil spring disposed between said leaf spring and bolster intermediate the ends of said leaf spring.

30. In a car truck, the combination of a side frame including tension and compression members and spaced integrally connecting columns forming a window, a transom supported in said window through a metallic spring, a spring plank movably supported on said transom, a bolster, a semi-elliptic leaf spring supported on said spring plank at a point intermediate the ends of said leaf spring and supporting said bolster at spaced points, and a coil spring interposed between said bolster and leaf spring inwardly of said side frame.

31. In a car truck, the combination of a side frame including tension and compression members and spaced integrally connecting columns forming a window, a transom supported in said window through a metallic spring, a spring plank movably supported on said transom, a bolster, a semi-elliptic leaf spring supported on said spring plank at a point intermediate the ends of said leaf spring and supporting said bolster at spaced points, and a coil spring interposed between said bolster and spring plank.

32. In a car truck, the combination of a side frame including tension and compression members and spaced integrally connecting columns forming a window, a transom supported in said window through a metallic spring, a spring plank movably supported on said transom, a bolster, a semi-elliptic leaf spring supported on said spring plank at a point intermediate the ends of said leaf spring and supporting said bolster at spaced points and a coil spring interposed between said bolster and leaf spring at the inner of said spaced points.

33. In a car truck, the combination of a side frame including tension and compression members and spaced integrally connecting columns forming a window, a transom supported in said window through a metallic spring, a spring plank movably supported on said transom, a bolster, a semi-elliptic leaf spring supported on said spring plank at a point intermediate the ends of said leaf spring and supporting said bolster at spaced points and a metallic spring interposed between bolster and leaf spring at the inner of said spaced points.

34. In a car truck, the combination of a side frame including tension and compression members and spaced integrally connecting columns forming a window, a transom supported in said window through a metallic spring, a spring plank movably supported on said transom, a bolster, a semi-elliptic leaf spring supported on said spring plank at a point intermediate the ends of said leaf spring and supporting said bolster at spaced points and a coil spring interposed between said bolster and leaf spring at the inner of said spaced points and another coil spring interposed between said bolster and said spring plank.

35. In a car truck, the combination of a side frame including tension and compression members and spaced integrally connecting columns forming a window, a transom supported in said window through a metallic spring, a spring plank movably supported on said transom, a bolster, a semi-elliptic leaf spring supported on said spring plank at a point intermediate the ends of said leaf spring and supporting said bolster at spaced points and a coil spring interposed between said bolster and leaf spring at the inner of said spaced points and another coil spring interposed between said bolster and said leaf spring.

36. In a car truck, the combination of a side frame including tension and compression members and spaced integrally connecting columns forming a window, a transom supported in said window through a metallic spring, a spring plank supported on said transom, a bolster, a semi-elliptic leaf spring supported on said spring plank at a point intermediate the ends of said leaf spring and supporting said bolster at spaced points, and coil springs interposed between said bolster and leaf spring inwardly of said side frame between said spaced points.

37. In a car truck, the combination of a side frame including tension and compression members and spaced integrally connecting columns forming a window, a transom supported in said window through a metallic spring, a spring plank supported on said transom, a bolster, a semi-elliptic leaf spring supported on said spring plank at a point intermediate the ends of said leaf spring and supporting said bolster at spaced points, and coil springs interposed between said bolster and leaf spring inwardly of said side frame between said spaced points and intermediate said spaced points.

38. In a car truck, the combination of a side frame including tension and compression members and spaced integrally connecting columns forming a window, a transom supported in said window through a metallic spring, a spring plank movably supported on said transom, a bolster provided with spaced spring seats one of said seats being disposed inwardly of the side frame and the other of said seats being disposed substantially in the plane of said side frame, a semi-elliptic leaf spring supported on said spring plank at a point intermediate the ends of said leaf spring and supporting said bolster at said spring seats, and a coil spring interposed between said bolster and said leaf spring.

39. In a car truck, the combination of a side frame including tension and compression members and spaced integrally connecting columns forming a window, a transom supported in said window through a metallic spring, a spring plank movably supported on said transom, a bolster provided with spaced spring seats one of said seats being disposed inwardly of the side frame and the other of said seats being disposed substantially in the plane of said side frame, a semi-elliptic leaf spring supported on said spring plank at a point intermediate the ends of said leaf spring and supporting said bolster at said spring seats, and a coil spring interposed between said bolster and said leaf spring intermediate said spring seats.

40. In a car truck, the combination of a side frame including tension and compression members and spaced integrally connecting columns forming a window, a transom supported in said window through a metallic spring, a spring plank movably supported on said transom, a bolster, a semi-elliptic leaf spring supported on said spring plank at a point intermediate the ends of said leaf spring and supporting said bolster at spaced points, a coil spring interposed between said bolster and leaf spring substantially in the plane of the side frame and another coil spring interposed between said bolster and leaf spring.

41. In a car truck, the combination of a side frame including tension and compression members and spaced integrally connecting columns forming a window, a transom supported in said window through a metallic spring, a spring plank movably supported on said transom, a bolster, a semi-elliptic leaf spring supported on said spring plank at a point intermediate the ends of said leaf spring and supporting said bolster at spaced points, a coil spring interposed between said bolster and leaf spring substantially in the plane of the side frame and another coil spring interposed between the bolster and said semi-elliptic spring.

42. In a car truck, the combination of a side frame including tension and compression members and spaced integrally connecting columns forming a window, a transom supported in said window through a metallic spring, a spring plank movably supported on said transom, a bolster, a semi-elliptic leaf spring supported on said spring plank at a point intermediate the ends of said leaf spring and supporting said bolster at spaced points, a coil spring interposed between said bolster and leaf spring substantially in the plane of the side frame and a coil spring interposed between the bolster and said semi-elliptic spring and intermediate the ends of said semi-elliptic spring.

Signed at Chicago, Illinois, this 17th day of November, 1931.

HOWARD SOMERVELL.